US00RE35332E

United States Patent [19]

Nagahama et al.

[11] E Patent Number: Re. 35,332

[45] Reissued Date of Patent: Sep. 24, 1996

[54] OPTICAL PICKUP DEVICE WITH DIFFRACTION DEVICE

[75] Inventors: Toshiya Nagahama, Nara; Yoshio Yoshida, Tenri; Yasuo Nakata, Tenri; Yukio Kurata, Tenri, all of Japan

[73] Assignee: Sharp Kabushiki Kaisha, Osaka, Japan

[21] Appl. No.: 123,459

[22] Filed: Sep. 17, 1993

Related U.S. Patent Documents

Reissue of:

[64] Patent No.: 5,049,732
Issued: Sep. 17, 1991
Appl. No.: 424,373
Filed: Oct. 19, 1989

[30] Foreign Application Priority Data

Oct. 21, 1988 [JP] Japan ..... 63-266425
Apr. 13, 1989 [JP] Japan ..... 1-95646

[51] Int. Cl.[6] ..... G01J 1/20; G11B 7/00

[52] U.S. Cl. ..... 250/201.5; 250/237 G; 369/44.37

[58] Field of Search ..... 250/201.5, 237 G; 369/44.12, 44.23, 44.24, 44.37, 44.38, 44.41; 359/11, 19, 566

[56] References Cited

U.S. PATENT DOCUMENTS

| | | | |
|---|---|---|---|
| 4,143,402 | 3/1979 | Bricot et al. | 369/44.37 |
| 4,665,310 | 5/1987 | Heemskerk | 250/201 |
| 4,731,772 | 3/1988 | Lee | 369/44.23 |
| 4,733,065 | 3/1988 | Hoshi et al. | 250/201.5 |
| 4,768,183 | 8/1988 | Ohnishi et al. | 369/44.37 |
| 4,817,072 | 3/1989 | Toide et al. | 250/201.5 |
| 4,817,074 | 3/1989 | Yamanaka | 250/201.5 |
| 4,829,506 | 5/1989 | Bressers et al. | 350/3.72 |
| 4,888,752 | 12/1989 | Arai | 250/201.5 |
| 4,904,856 | 2/1990 | Nagahama et al. | 250/201 |

FOREIGN PATENT DOCUMENTS

| | | |
|---|---|---|
| 0228620 | 7/1987 | European Pat. Off. . |
| 0273356 | 7/1988 | European Pat. Off. . |

OTHER PUBLICATIONS

Kimura et al. (1986) "An Optical Head Using Multifunctional Hologram for CD Players," NEC Corp., Opto–Electronics Res. Tabs, pp. 93–98.

*Primary Examiner*—Stephone B. Allen
*Attorney, Agent, or Firm*—Morrison & Foerster

[57] ABSTRACT

An optical pickup device in which a main beam and a pair of sub-beams are used and a diffraction device is disposed between a recording medium and a light receiving device such as a photodetector is disclosed. The diffraction device comprises first to third diffraction regions. The second and third regions receive light beams from the recording medium which are substantially identical in amount to each other. The light receiving device comprises a first to a fourth light receiving regions. The first and second light receiving regions are juxtaposed, and separated by a line. The main beam which has been diffracted by the first diffraction region is focused onto said line. The main beam which has been diffracted by the second diffraction region is focused onto the first light receiving region. The main beam which has been diffracted by the third diffracting region is focused onto the second light receiving region. The sub-beams which have been diffracted by the diffraction device are focused onto the third and fourth light receiving regions, respectively. Alternatively, the diffraction device comprises an area where one or more diffraction regions are formed. The farthest point of the area at the side of the light receiving device is separated from the optical axis by a predetermined distance, to prevent the first order diffracted beam from entering the optical system disposed between the diffraction device and a recording medium.

14 Claims, 9 Drawing Sheets

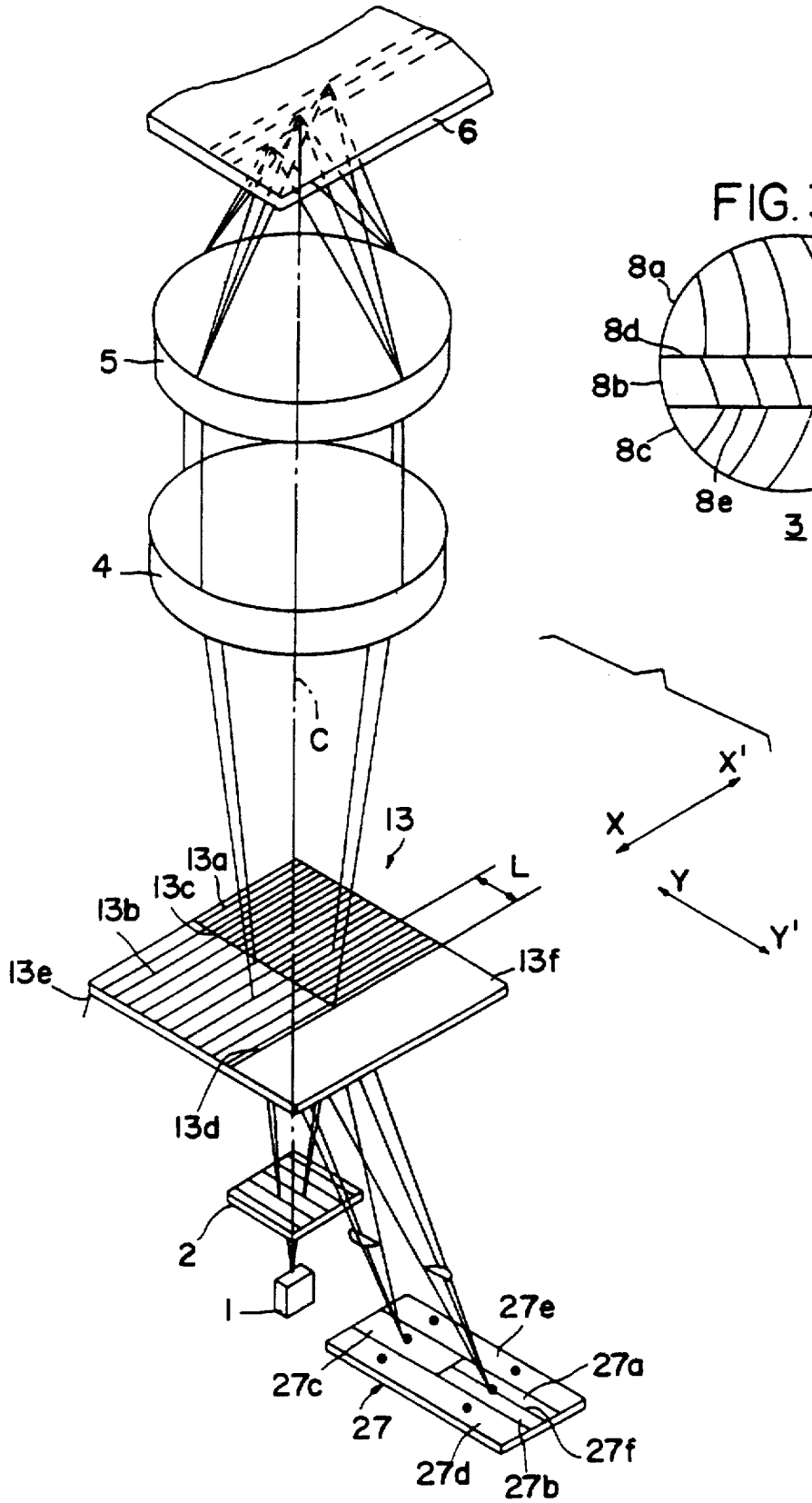
FIG. 4
FIG. 3
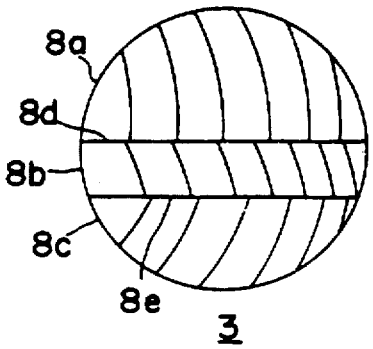

OPTICAL PICKUP DEVICE WITH DIFFRACTION DEVICE

Matter enclosed in heavy brackets [ ] appears in the original patent but forms no part of this reissue specification; matter printed in italics indicates the additions made by reissue.

BACKGROUND OF THE INVENTION

1. Field of the invention

This invention relates to an optical pickup device which is useful in an information recording and/or reproducing apparatus such as a compact disc reproducing apparatus, a video disc reproducing apparatus and the like.

2. Description of the prior art

FIG. 9 shows a conventional optical pickup device. The device of FIG. 9 comprises a semiconductor laser device 1, a first diffraction device 2, a second diffraction device 23, a collimating lens 4, an object lens 5, and a photodetector 17. A light beam from the semiconductor laser device 1 is diffracted by the first diffraction device 2 to produce three separate light beams, one of which is the zero-order diffracted beam (hereinafter, referred to as "the main beam"), and the others of which are the first-order diffracted beams (hereinafter, referred to as "the sub-beams") in the positive and negative directions which are substantially orthogonal to the sheet of the drawing of FIG. 9. These three separate beams are further diffracted by the second diffraction device 23. The resulting zero-order diffracted beam of each of the above-mentioned separate beams enters the object lens 5 through the collimating lens 4, and is focused on a recording medium 6 The main beam is focused on a pit of the recording medium 6. The two sub-beams, which are positioned symmetrically with respect to the above-mentioned main beam, are focused on the recording medium 6 in such a manner that they shift to a large extent in the tracking direction of the recording medium 6 and to a small extent in the radial direction. The beams reflected from the recording medium 6 pass through the object lens 5 and the collimating lens 4, and are diffracted by the second diffraction device 23. The resulting first-order diffracted beams are introduced into the photodetector 17.

As shown in FIG. 10A, the diffraction device 23 is divided into two diffraction regions 23a and 23b by a division line 23c, when viewed from the side of the recording medium 6. The regions 23a and 23b have a number of grating lines which are inclined with respect to the division line 23c and which are symmetrical about the division line 23c. The photodetector 17 is divided into six regions 17a to 17f, as shown in FIG. 10B. The division line 23c elongates in the radial direction of the recording medium 6.

When a beam from the semiconductor laser device 1 is precisely focused on the recording medium 6 or set at the correct focus, the resulting main beam which has been diffracted by the region 23a of the diffraction device 23 is focused on the division line $A_1$ of the photodetector 17 to form a spot $Q_1$, and the resulting main beam which has been diffracted by the region 23b of the diffraction device 23 is focused on the division line $B_1$ to form a spot $Q_2$. The resulting sub-beams are focused on the regions 17e and 17f of the photodetector 17. When output signals of the photodetecting regions 17a to 17f are represented respectively as $S_{1a}$ to $S_{1f}$, a focus error signal is obtained by calculating $(S_{1a}+S_{1d})-(S_{1b}+S_{1c})$, a tracking error signal is obtained by calculating $(S_{1e}-S_{1f})$ and a pit signal (i.e., an information signal) is obtained by calculating $(S_{1a}+S_{1b}+S_{1c}+s_{1d})$.

FIG. 11 shows another conventional optical pickup device. The optical pickup device of FIG. 11 is different from the above-mentioned conventional device in the configurations of a second diffraction device 33 and a photodetector 27 The configuration of the grating lines of the diffraction device 33 and that of the photodetector 27, which are viewed from the recording medium 6, are shown in FIGS. 12A and 12B, respectively The diffraction device 33 is divided into two regions 33a and 33b by a division line 33c which elongates in the radial direction. The regions 33a and 33b have a number of grating lines which are at right angles to the division line 33c, and the grating period of the region 33a is different from that of the other region 33b. The photodetector 27 is divided into six regions 27a to 27f. When a beam from the semiconductor laser device 1 is precisely focused on the recording medium 6 or set at the correct focus, the resulting main beam which has been diffracted by the region 33a is focused on the division line $A_2$ to form a spot $R_1$ thereon, and the resulting main beam which has been diffracted by the region 33b is focused on the division line $B_2$ to form a spot $R_2$ thereon. The resulting sub-beams are focused on the photodetecting regions 27e and 27f. When output signals of the photodetecting regions 27a to 27f are represented respectively as $S_{2a}$ to $S_{2f}$, a focus error signal is obtained by calculating $(S_{2a}+S_{2d})-(S_{2b}+S_{2c})$, a tracking error signal is obtained by calculating $(S_{2e}-S_{2f})$, and a pit signal is obtained by calculating $(S_{2a}+S_{2b}+S_{2c}+S_{2d})$.

In the conventional optical pickup devices with the above-mentioned structures, the spots $Q_1$ and $Q_2$ ($R_1$ and $R_2$) based on the beams reflected from the recording medium 6 must be very precisely formed on the division lines of the photodetector 17(27). To achieve this, a delicate adjustment must be carried out so that the diffraction device 23(33) and the photodetector 17(27) respectively can be disposed at a given position. However, in order that the diffraction device 23(33) and the photodetector 17(27) are constructed to be moved separately or independently from the diffraction device 23(33), there must be a supporting structure by which the photodetector 17(27) can be freely moved. This makes the entire structure of the pickup device complicated, causing difficulties in obtaining a light-weight, miniaturized pickup device. Moreover, a number of positioning parts are needed, which makes the production process of the pickup device complicated and makes the production cost expensive.

To solve these problems, the inventors of this invention designed to incorporate both the semiconductor laser device 1 and the photodetector 17(27) into the same package so that the positioning of the spots $Q_1$ and $Q_2$($R_1$ and $R_2$) on the division lines of the photodetector 17/(27) can be carried out by the positional adjustment of the diffraction device 23(33) alone. However, in a optical pickup device with such a structure, the slight shifting of the positions of the photodetector 17(27) from those of the initial plan makes it impossible to form the beam spots at the correct positions of the photodetector 17(27), resulting in a focus offset. To remove this focus offset, the position of the diffraction device 23(33) must be moved linearly and/or rotationally with respect to other components such as the semiconductor laser device 1 to shift the spots on the photodetector 17(27), so that the focus error signal becomes zero when the beam from the semiconductor laser device 1 is at the correct focus on the recording medium 6. However, the two spots on the photodetector 17(27) which are formed based on the main beams shift at the same time, resulting in that the position of each beam spot cannot be independently adjusted without the simultaneous shifting of these beam spots on the photodetector 17(27). Moreover, there is a possibility that the shifting of the two spots are countervailed on the focus error signals corresponding thereto. To avoid this, the diffraction device 23(33) must be moved to a great extent in the Y-direction (FIGS. 10B and 12B). Especially, in the optical pickup device shown in FIG. 11, the length of each of the divided regions of the photodetector 27 in the y-direction is short. Therefore, when a great focus offset occurs and the diffraction device 33 is moved to a great extent in the y-direction to compensate the said focus offset, the beam spots $R_1$ and $R_2$ on the photodetector 27 shift to a great extent in the y-direction and slip out of the photodetecting regions on which these spots must be formed.

Moreover, because the diffraction device 23 (33) must be moved linearly to compensate for the focus offset phenomenon, the photodetector 17(27) is required to have a large enough size to receive the beam spots thereon, which makes the production cost thereof expensive.

FIG. 13 shows an optical pickup device which is disclosed in U.S. Ser. No. 07/282,109, European Patent Appln. No. 88311665.9 and Canadian Patent Appln No. 585,356. In the pickup device of FIG. 13, the diffraction device 43 consists of two diffraction regions 43a and 43b which are formed by dividing the whole area of the diffraction device by a division line 43c. The diffraction regions 43a and 43b have a number of grating lines which elongate in the track direction of the recording medium 6 (X—X' direction in FIG. 13). The division line 43c elongates in the direction (Y—Y' direction in FIG. 13) which is perpendicular to the track direction. The photodetector 37 is divided into five regions 37a to 37e. The division line 37f extends in the Y—Y' direction to separate the regions 37a and 37b.

The main beam which has been diffracted by the diffraction region 43a is focused on the division line 37f to form a spot $S_1$, and the main beam which has been diffracted by the diffraction region 43b is focused on the region 37c to form a spot $S_2$. The sub-beams are focused on the regions 37d and 37e to form spots $S_3$ to $S_6$. When a beam from the semiconductor laser device 1 is precisely focused on the recording medium 6, the spots $S_1$ to $S_6$ are formed as tiny spots as shown in FIG. 14B. In contrast, when the distance between the recording medium 6 and the object lens 5 becomes small (or large), the spots $S_3$ to $S_6$ are formed so as to be extended in semicircular shapes as shown in FIG. 14B (or in FIG. 14C). The regions 37a to 37e on which spots $S_3$ to $S_6$ are formed produce signals $S_a$ to $S_e$, respectively. A focus error signal is obtained by calculating $(S_a-S_b)$, a tracking error signal by calculating $(S_d-S_e)$, and an information signal by calculating $(S_a+S_b+S_c)$.

The optical pickup device of FIG. 13 has a drawback in that a spurious signal is generated in the focus signal, tracking error signal and information signal. This will be described with reference to FIGS. 15 and 16. A light beam emitted from the semiconductor laser device 1 is divided into a main beam and two sub-beams by the diffraction device 2, and enters in the diffraction device 43. For example, the resulting first-order diffracted beam diffracted by dividing the diffraction region 43b propagates as indicated by the phantom lines A, as if it is a light beam emitted from the spot $S_2$ toward the diffraction device 43. Therefore, this first-order diffracted beam is focused by the lenses 4 and 5 on the position of the recording medium 6, a position which corresponds to the spot $S_2$ (i.e., the position is the image point of the spot $S_2$). As shown by the phantom lines B, this first-order diffracted beam is reflected by the recording medium 6 to enter into the diffraction device 43 through the lenses 5 and 4, and the resulting zero-order diffracted beam is focused on the photodetector 37 as the spot $S_2$. Similarly, the resulting first-order diffracted beam diffracted by dividing the diffraction region 43a is reflected by the recording medium 6, and then focused on the photodetector 37 as the spot $S_1$.

The first-order diffracted beams which are diffracted by the diffraction device 43 are not the light beams to be used for detecting signals. When these first-order diffracted beams are once received by the photodetector 37, therefore, a spurious signal is generated in the focus error signal and information signal. This causes the focus control to be incorrectly conducted, and an incorrect information signal to be produced. Also, the diffraction device 43 produces first-order diffracted beams based on the sub-beams which have been diffracted by the diffraction device 2, so that a spurious signal is also generated in the tracking error signal, thereby impeding the tracking control In this way, the first-order diffracted beams produced by the diffraction device 43 cause a spurious signal in detection signals so that the optical pickup device cannot function properly.

SUMMARY OF THE INVENTION

The optical pickup device of this invention, which overcomes the above-discussed and numerous other disadvantages and deficiencies of the prior art, comprises a main beam and a pair of sub-beams are reflected from a recording medium, and directed to a light receiving device through a diffraction device, said diffraction device comprises first to third diffraction regions, said second and third diffraction regions receiving light beams from said recording medium which are substantially identical in amount to each other, said light receiving device comprises a first to a fourth light receiving regions, said first and second light receiving regions being juxtaposed, and separated by a line, the main beam which has been diffracted by said first diffraction region is focused onto said line, the main beam which has been diffracted by said second diffraction region is focused onto said first light receiving region, the main beam which has been diffracted by said third diffraction region is focused onto said second light receiving region, and the sub-beams which have been diffracted by said diffraction device are focused onto said third and fourth light receiving regions, respectively.

In a preferred embodiment, the line extends along a direction which substantially coincides with the diffraction direction along which said main beam is diffracted in said first diffraction region.

In a preferred embodiment, the diffraction regions are different in grating period from each other.

In a preferred embodiment, the diffraction device has a circular shape.

In a preferred embodiment, the first diffraction region is formed into a semicircular shape, and said second and third diffracting regions are formed into a quadrant shape, respectively.

In a preferred embodiment, gratings of said first to third diffraction regions are inclined to each other.

In a preferred embodiment, gratings of said second and third diffraction regions extend at opposite angles with respect to said line.

In a preferred embodiment, the first diffraction region is formed into a semicircular shape, said second and third diffracting regions share a semicircle, and said second diffracting region is formed into a strip-like shape positioned between said first and third diffraction regions.

The optical pickup device comprises a light source; a diffraction device; an optical system disposed between said diffraction device and a recording medium, said optical system focusing light beams which include at least first-order diffracted beams and which are diffracted by said diffracting device, onto said recording medium, said optical system directing light beams reflected from said recording medium to said diffraction device; and a light receiving device which receives light beams from said diffraction device, said diffraction device comprises an area where one or more diffraction regions are formed, the optical axis of said light source passing through said area, the farthest point of said area at the side of said light receiving device being separated from said optical axis by a predetermined distance, the other farthest point of said area at the opposite side of said light receiving device being separated from said optical axis by a distance which is greater than said predetermined distance.

In a preferred embodiment, a first-order diffracted beam from said diffraction device is prevented from entering into said optical system.

In a preferred embodiment, the diffraction device comprises another area where no diffraction region is formed, said other area being positioned more closely to said light receiving device than said area.

Thus, the invention described herein makes possible the objectives of (1) providing an optical pickup device in which the focus offset can be adjusted simply by rotating a diffraction device;

(2) providing an optical pickup device in which the focus offset can be easily adjusted without linearly moving a diffraction device;

(3) providing an optical pickup device in which the size of a light receiving device can be reduced;

(4) providing an optical pickup device in which a spurious signal is not produced; and (5) providing an optical pickup device which can function properly.

BRIEF DESCRIPTION OF THE DRAWINGS

This invention may be better understood and its numerous objects and advantages will become apparent to those skilled in the art by reference to the accompanying drawings as follows:

FIG. 3 is a plan view of a diffraction device used in another optical pickup device according to the invention FIG. 4 is a perspective view illustrating a further optical pickup device according to the invention.

DESCRIPTION OF THE PREFERRED EMBODIMENTS

Figure 1:
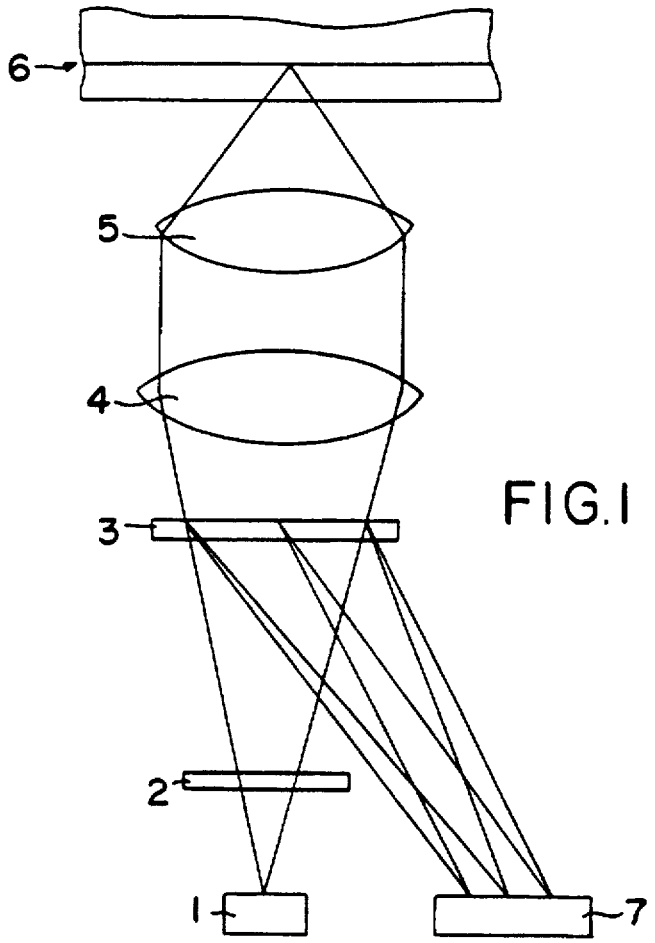
FIG. 1 illustrates diagrammatically an optical pickup device according to the invention.
Figure 9:
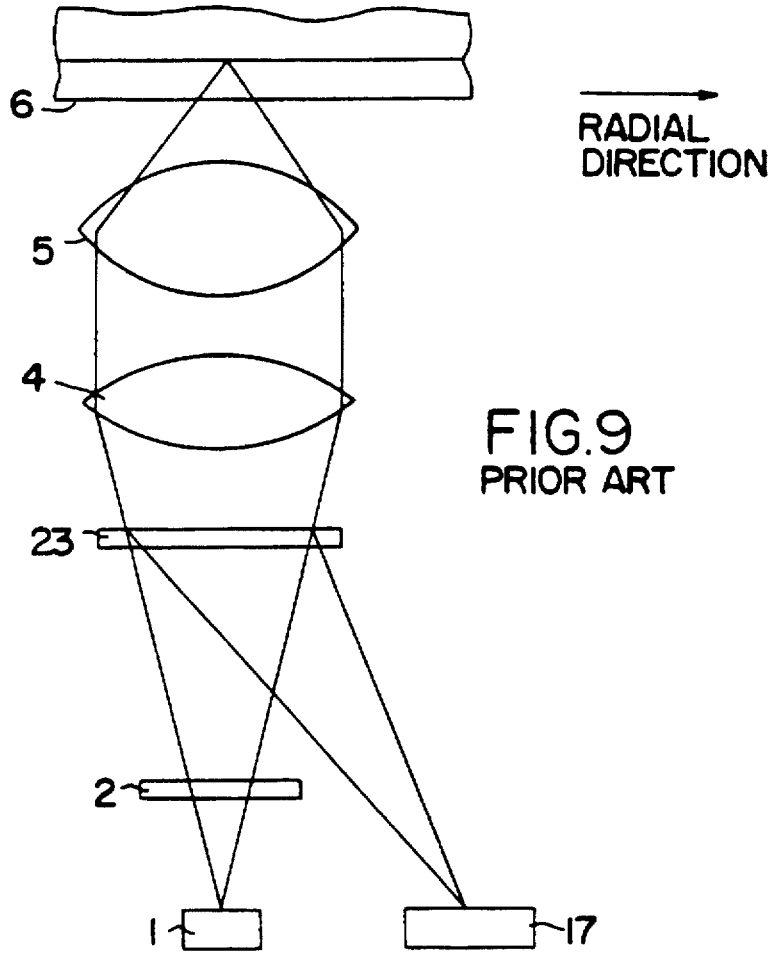
FIG.9 PRIOR ART
FIG. 9 illustrates diagrammatically a conventional optical pickup device.
Figure 10A:
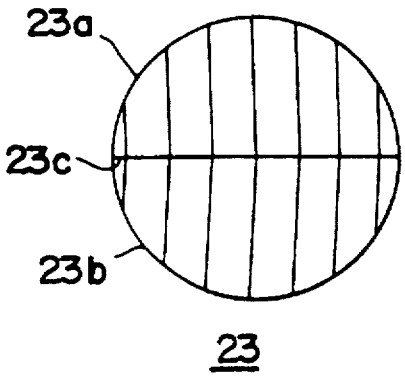
FIG.10A PRIOR ART
FIG. 10A is a plan view of a diffraction device used in the optical pickup device of FIG. 9.
Figure 10B:
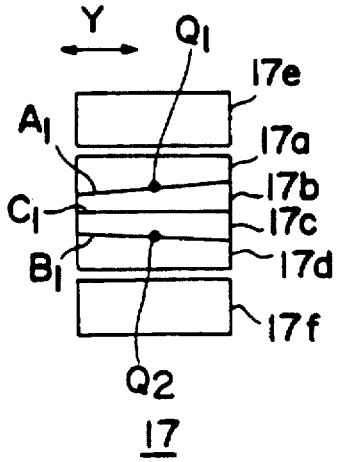
FIG.10B PRIOR ART
FIG. 10B is a plan view of a photodetector used in the optical pickup device of FIG. 9.
Figure 11:
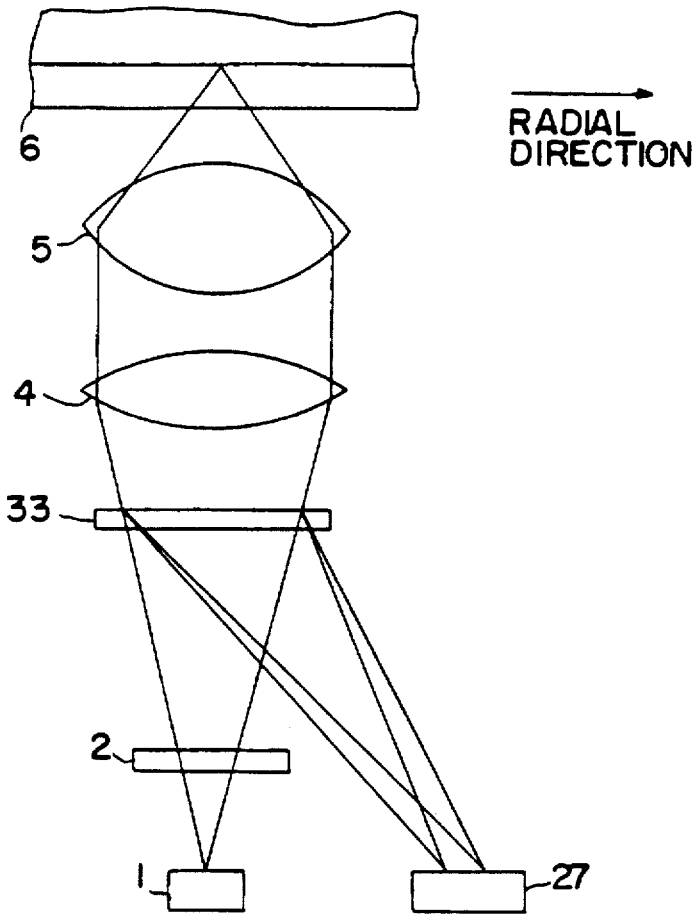
FIG.11 PRIOR ART
FIG. 11 illustrates diagrammatically another conventional optical pickup device.
Figure 12A:
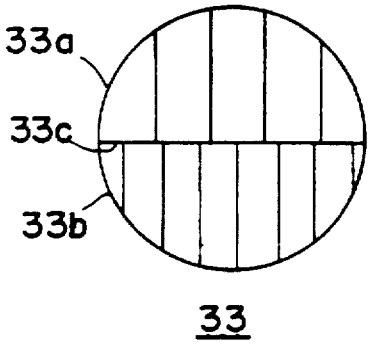
FIG.12A PRIOR ART
FIG. 12A is a plan view of a diffraction device used in the optical pickup device of FIG. 11.
Figure 12B:
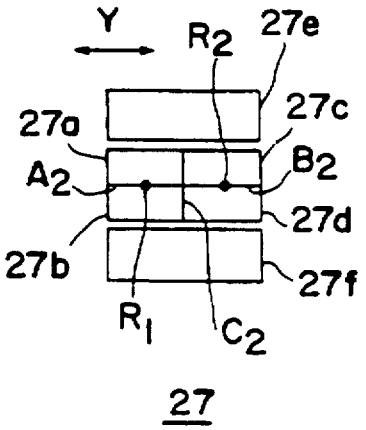
FIG.12B PRIOR ART
FIG. 12B is a plan view of a photodetector used in the optical pickup device of FIG. 11.

FIG. 1 shows an optical pickup device according to the invention. The pickup device of FIG. 1 comprises a semiconductor laser device 1, a first diffraction device 2, a second diffraction device 3, a collimating lens 4, an object lens 5, and a photodetector 7. In this embodiment, the semiconductor laser device 1 and photodetector 7 are mounted to a single base in the same package so that their positional relationship is fixed. The laser device 1, first diffraction device 2, collimating lens 4 and object lens 5 can be constructed in a similar manner to those used in the pickup device of FIG. 9 except for a second diffraction device 3 and photodetector 7, and therefore their detailed description is omitted.

Figure 2A:
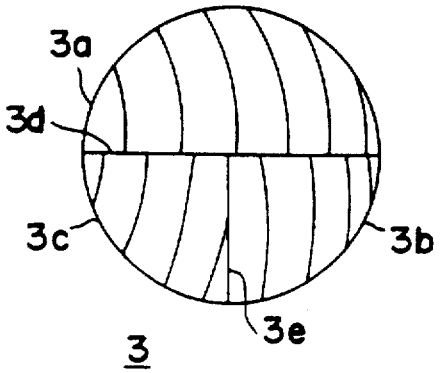
FIG. 2A is a plan view of a diffraction vice used in the optical pickup device of FIG. 1.

As shown in FIG. 2A, the diffraction device 3 has a circular shape as a whole, and is divided into three diffraction regions 3a, 3b and 3c by division lines 3d and 3e, when viewed from the side of the recording medium 6. The division line 3d corresponds to a diameter of the circle so that the first diffraction region 3a is formed into a semicircular shape. The second and third diffraction regions 3b and 3c are formed by dividing the other semicircle by the division line 3e which extends from the center of the circle and is perpendicular to the division line 3d, thereby making the two regions 3b and 3c receive a same amount of light as each other. The grating lines of the second and third diffraction regions 3b and 3c, which are inclined with respect to the grating lines of the first diffraction region 3a, extend at an opposite angle. In order to compensate the aberration, in the three regions 3a to 3c, the grating lines are gently curved, and the grating periods are gradually changed. In this embodiment, the center grating period of the first diffraction region 3a is smaller than that of the second diffraction region 3b, and greater than that of the third diffraction region 3c. The order of the grating periods is not limited to the above, but are adequately determined in accordance with the relative positional relationship between the light source 1, the second diffraction device 3 and spots on the photodetector 7 which will be described below.

Figure 2B:
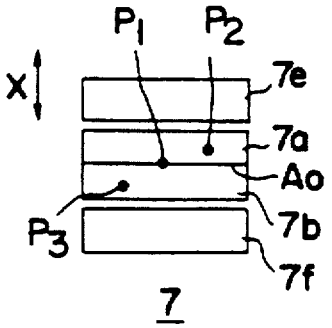
FIG. 2B is a plan view of a photodetector used in the optical pickup device of FIG. 1.

The photodetector 7 is divided into four regions 7a, 7b, 7e and 7f, as shown in FIG. 2B. The regions 7a and 7b are juxtaposed, and separated by the division line $A_0$. The division line $A_0$ elongates in substantially the same direction as the diffraction direction but is slightly inclined with respect to the diffraction direction, so as to prevent a focus offset due to the change in wavelength from occurring.

When a beam from the semiconductor laser device 1 is precisely focused on the recording medium 6, the resulting main beam which has been diffracted by the diffraction region 3a of the diffraction device 3 is focused on the division line $A_0$ of the photodetector 7 to form a spot $P_1$, the resulting main beam which has been diffracted by the region 3b is focused on the region 7a to form a spot $P_2$, and the resulting main beam which has been diffracted by the region 3c is focused on the region 7b to form a spot $P_3$. The resulting sub-beams which have been diffracted by the diffraction device 3 are focused on the regions 7e and 7f or the photodetector 7. When output signals of the photodetecting regions 7a, 7b, 7e and 7f are represented respectively as $S_a$, $S_b$, $S_e$ and $S_f$, a focus error signal is obtained by calculating ($S_{a-Sb}$) (the single knife edge method), a tracking error signal is obtained by calculating ($S_e-S_f$) (the three-beam method), and a pit signal is obtained by calculating ($S_a+S_b$).

In a pickup device having the above-described structure, the intensity of the spot $P_2$ equals to that of the spot $P_3$ so that they are offset in the focus error signal ($S_a-S_b$). Therefore, the focus offset can be adjusted simply by moving the spot $P_1$ formed on the photodetector 7 in the x-direction (FIG. 2B). This movement of the spot $P_1$ can be performed by rotating the diffraction device 3. In this way, the focus offset can be adjusted without linearly moving the diffraction device 3. Therefore, the size of the diffraction device 3 can be reduced so that it equals the size of a light beam entering thereon, thereby reducing the manufacturing cost and the size of the optical pickup device.

According to the invention, the diffraction device 3 may be constructed as shown in FIG. 3. The diffraction device 3 of FIG. 3 is divided into three diffraction regions 8a, 8b and 8c by two division lines 8d and 8e, when viewed from the side of the recording medium 6. The division line 8d corresponds to a diameter of the circle, and the first diffraction region 8a is formed into a semicircular shape. The division line 8e runs in the remaining semicircle in parallel with the division line 8d, so that the two regions 8b and 8c receive a same amount of light as each other. The grating lines of the second and third diffraction regions 8b and 8c which are inclined with respect to the grating line of the first diffraction region 8a, extend at an opposite angle. In order to compensate the aberration, in the three regions 8a to 8c, the grating lines are gently curved, and the grating periods are gradually changed. In this embodiment, the center grating period of the first diffraction region 8a is smaller than that of the second diffraction region 8b, and greater than that of the third diffraction region 8c. For the reason mentioned above, the order of the grating periods is not limited to the above, but may be adequately determined.

In the embodiment using the diffraction device 3 of FIG. 3, the light beams diffracted by the diffraction device 3 form spots on the photodetector 7 of FIG. 2B in the same manner as the pickup device of FIG. 1, and therefore the focus offset can be adjusted simply by moving the spot $P_1$.

Figure 13:
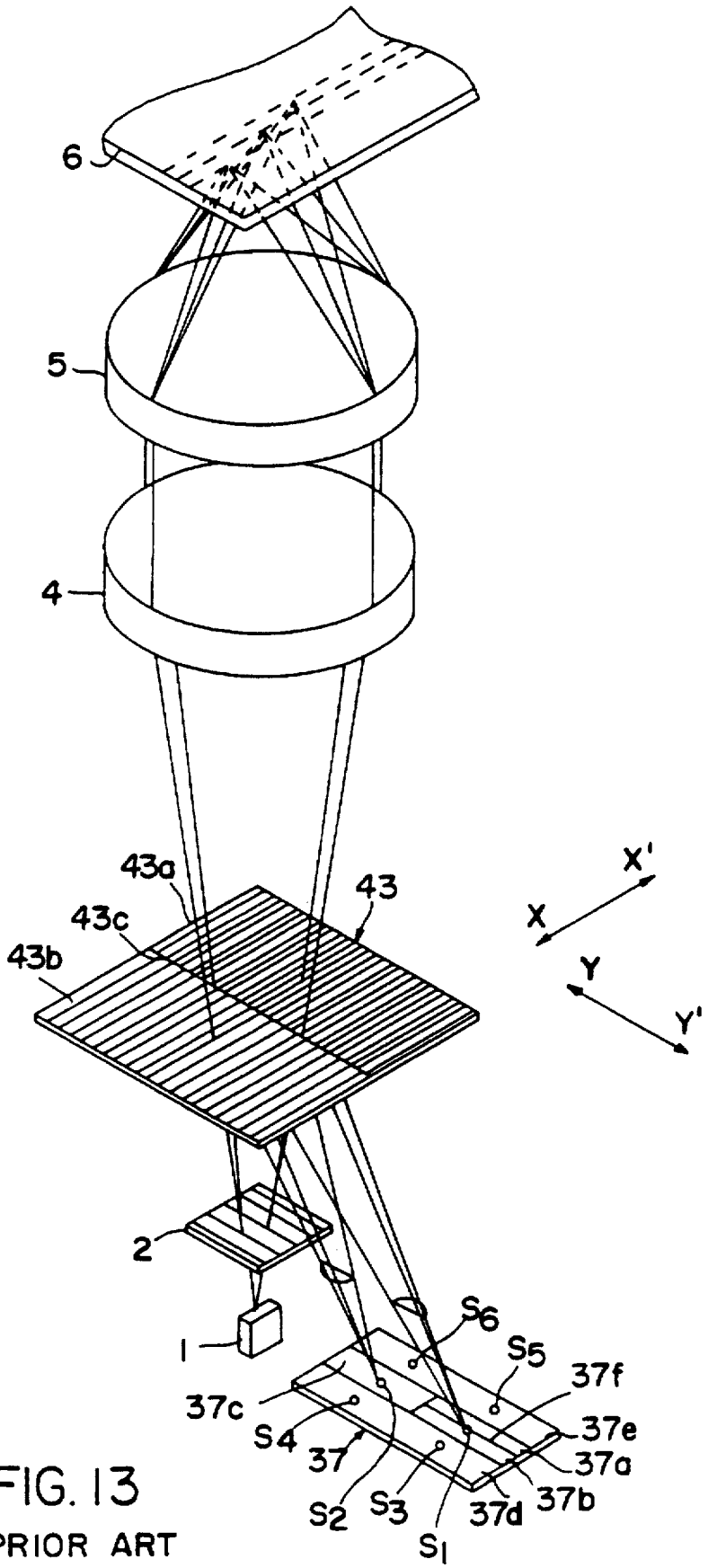
FIG. 13 PRIOR ART
FIG. 13 is a perspective view illustrating an improved optical pickup device.
Figure 14A:
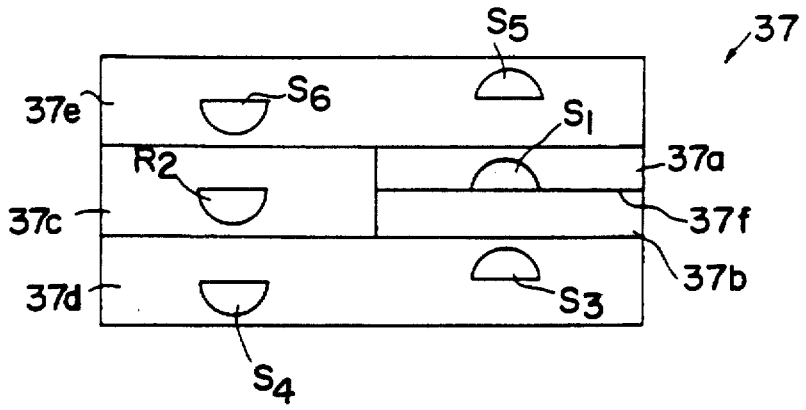
FIG.14A PRIOR ART
FIGS. 14A, 14B, and 14C illustrate positional relations of spots formed on the diffraction device shown in FIG. 13.
Figure 14B:
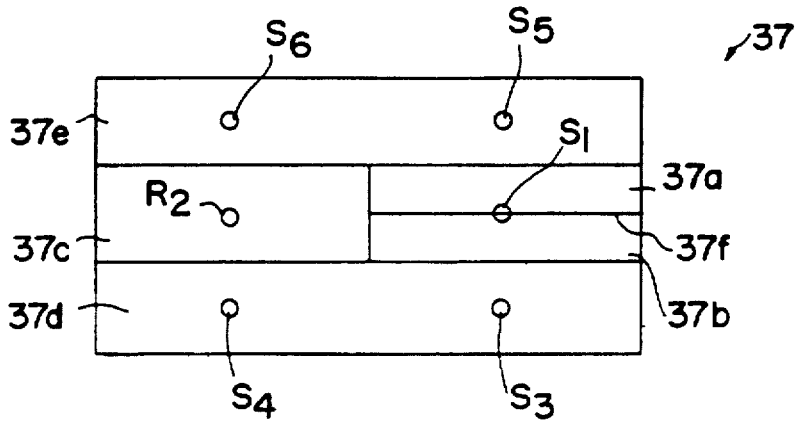
FIG.14B PRIOR ART
Figure 14C:
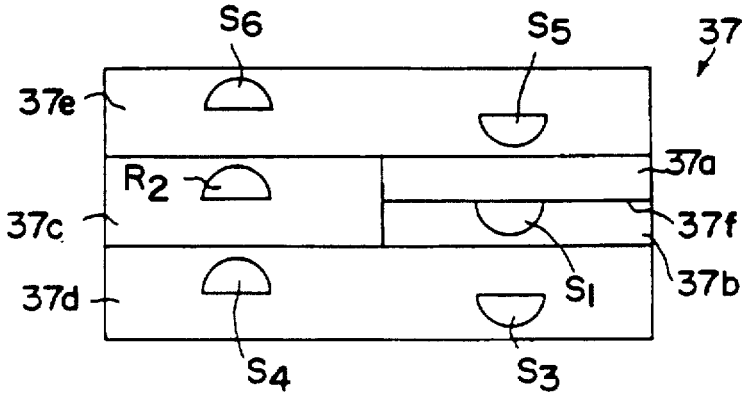
FIG.14C PRIOR ART
Figure 15:
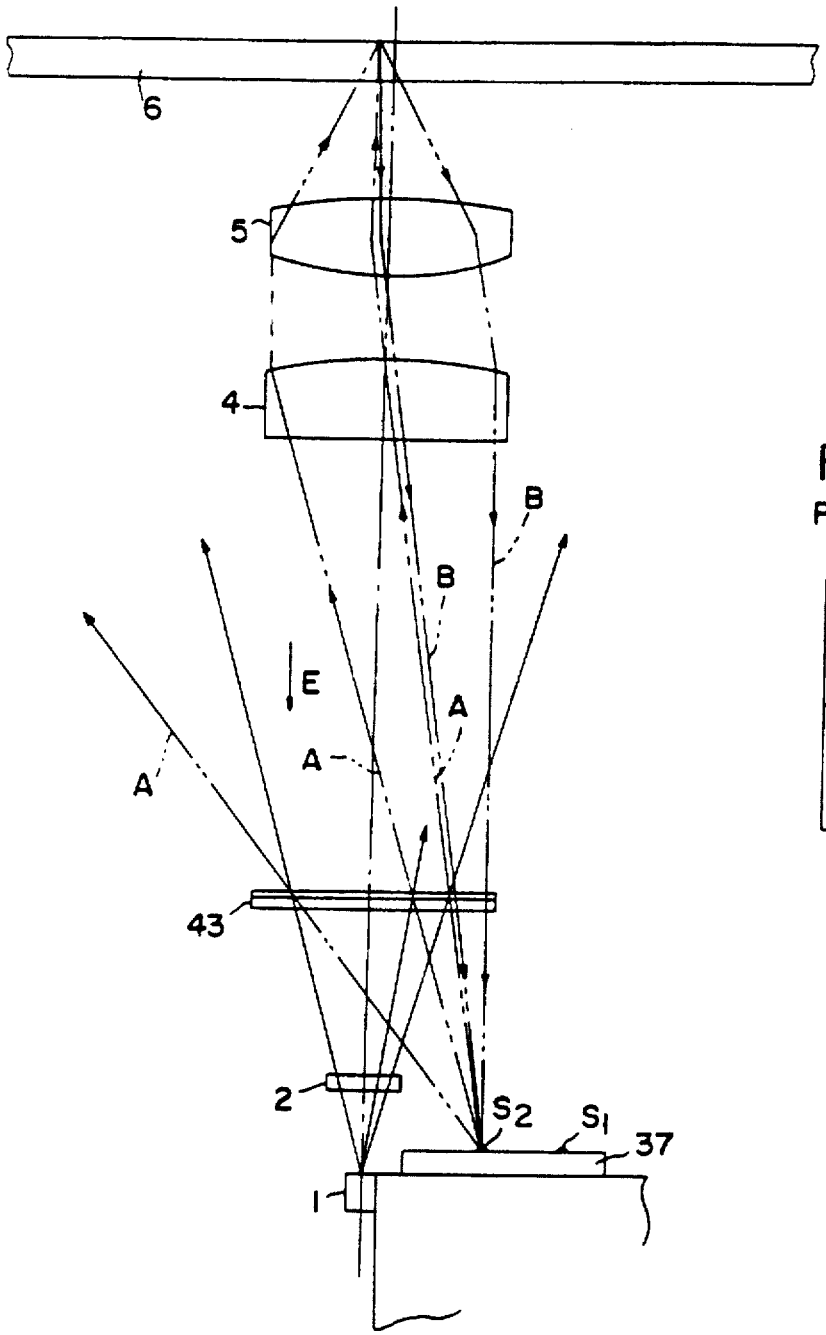
FIG. 15 PRIOR ART
FIG. 15 is a section view illustrating the optical pickup device of FIG. 13.
Figure 16:
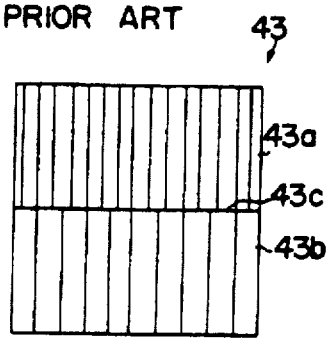
FIG. 16 PRIOR ART
FIG. 16 is a plan view of the diffraction device used in the optical pickup device of FIG. 13.

FIG. 4 shows a further optical pickup device according to the invention. The pickup device of FIG. 4 is constructed in the same manner as the pickup device of FIG. 13 except for a second diffraction device 13. In this embodiment, the second diffraction device 13 has a square shape when viewed from the recording medium 6, and is divided into two rectangular areas 13e and 13f which are separated by a division line 13d. The division line 13d, which is not an actually formed one but an imaginary one for describing the area 13e, runs in the track direction (X—X' direction) of the recording medium 6, and is separated from the optical axis C of a light beam emitted from the semiconductor laser device 1, by a predetermined distance L toward the photodetector 27. The distance between the optical axis and the farthest point of the area 3e at the opposite side of the photodetector 27 is greater than the distance L. The area 13e is divided by a division line 13c which is perpendicular to the division line 13d (i.e., the division line 13c runs in the Y—Y' direction), into two rectangular diffraction regions 13a and 13b where grating lines are formed in the track direction. The grating period of the first diffraction region 13a is slightly smaller than that of the second diffraction region 13b. The value of the distance L is selected so that the resulting first-order diffracted beams diffracted by the diffraction regions 13a and 13b do not enter the collimating lens 4.

Figure 5:
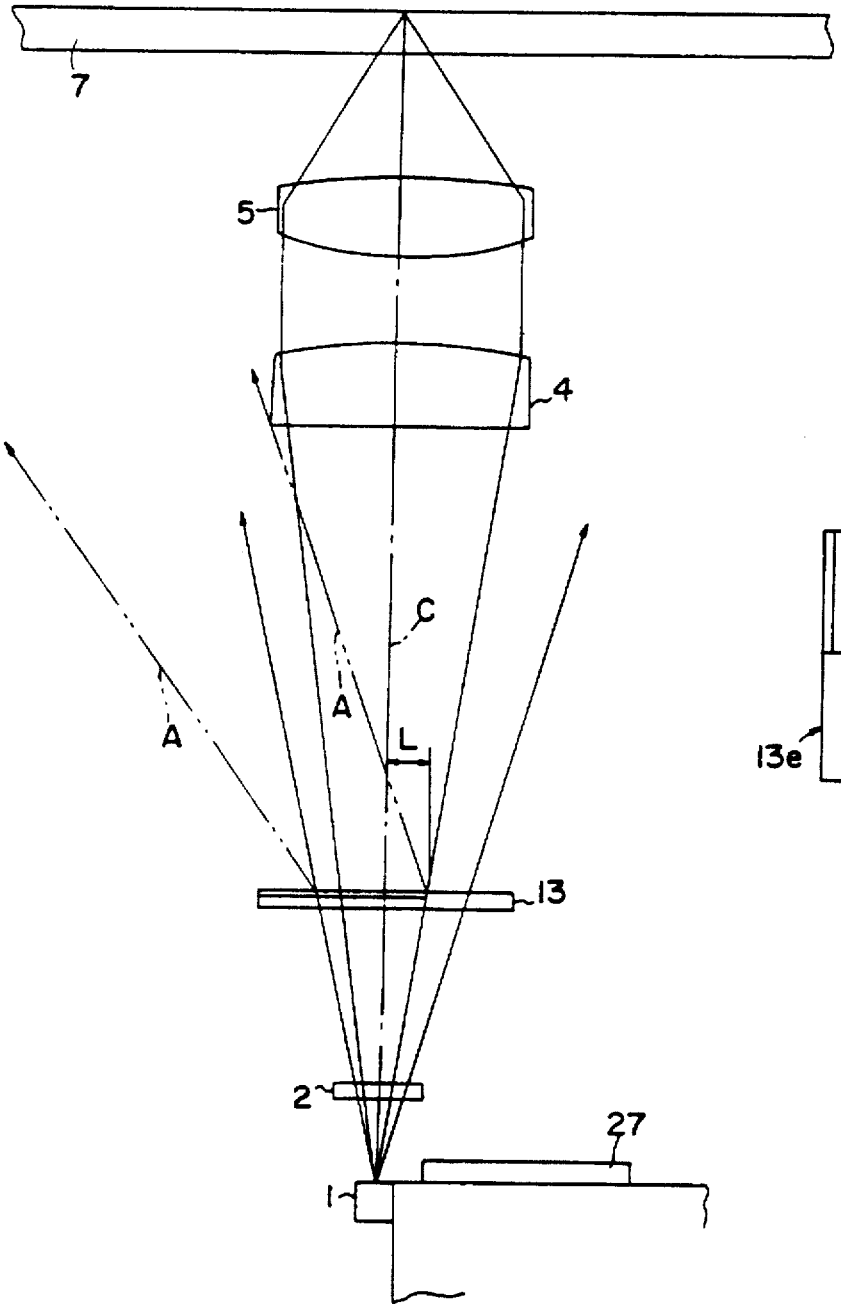
FIG. 5 is a section view of the optical pickup device of FIG. 4.
Figure 6:
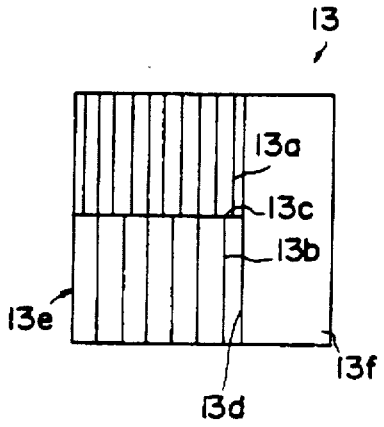
FIG. 6 is a plan view of a diffraction device used in the optical pickup device of FIG. 5.

In the pickup device of FIG. 4, the diffracted beams diffracted by the first diffraction device 2 are further diffracted by the second diffraction device 13. Because the second diffraction device 13 is provided with gratings only in the area 13e, the diffraction direction of each of the first-order diffracted beams is restricted as shown by the phantom lines A in FIG. 5 so that the first-order diffracted beams are prevented from entering the collimating lens 4. That is, the first-order diffracted beams diffracted by the diffraction device 13 are not focused, and therefore the photodetector 27 is substantially prevented from receiving the first-order diffracted beams reflected from the recording medium 6, thereby effectively suppressing the level of a spurious signal generated in the focus error signal, tracking error signal and information signal.

Figure 7A:
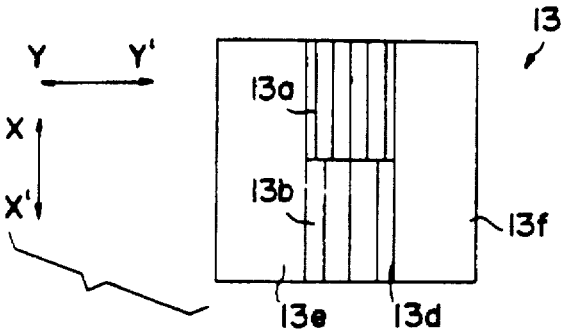
FIGS. 7A, 7B, 7C, and 7D illustrate various modifications of the diffraction device useful in the optical pickup device of FIG. 5.
Figure 7B:
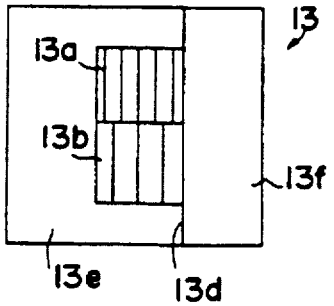
Figure 7C:
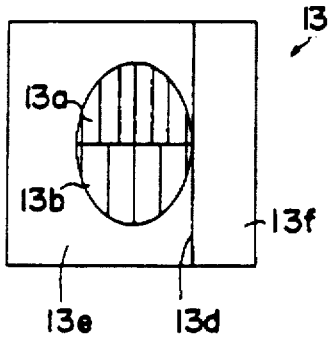
Figure 7D:
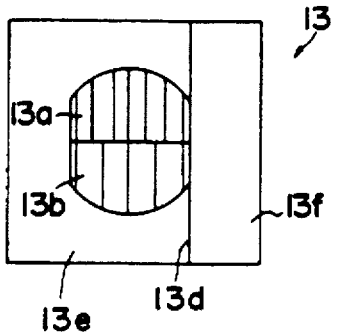
Figure 8:
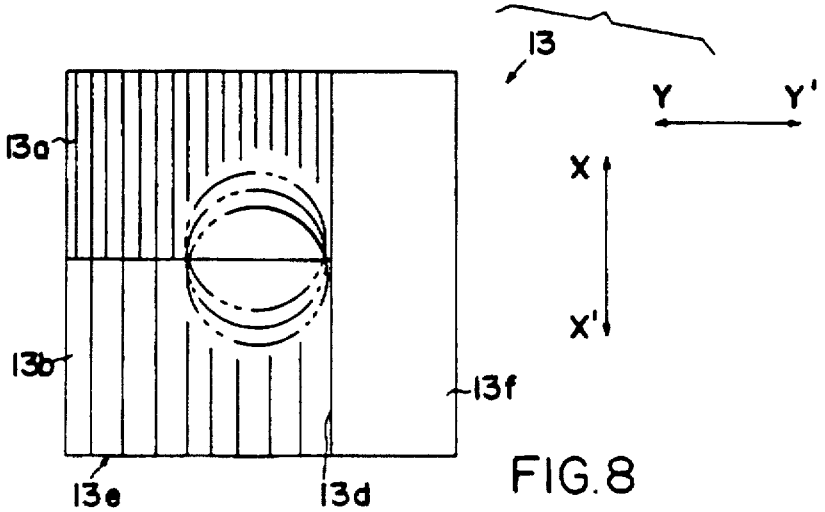
FIG. 8 illustrates positional relations of spots formed on the diffraction device of FIG. 6.

In the above-mentioned embodiment, gratings are formed in the whole of the area 13e of the diffraction device 13. The structure of the diffraction device 13 is not restricted to the above, but can be adequately formed in another manner. For example, the gratings are formed in a rectangular shape which is positioned at the center of the diffraction device 13 and elongates along the X—X' direction (FIG. 7A), in a rectangular shape which is shorter than the diffraction device 13 in the X—X' direction (FIG. 7B), in an oval shape (FIG. 7C), or in a shape which is a partly removed circle (FIG. 7D). The range of forming the diffraction ranges 13a and 13b my be restricted in either of the X—X' direction or the Y—Y' direction. When the diffraction device 13 is used in the three-beam method as in the case of this embodiment, the main beam (solid line) and sub-beams (two-dot dash lines) reflected from the recording medium 6 are slightly shifted from each other, as shown in FIG. 8. Hence, it is preferable that the diffraction ranges 13a and 13b are formed wider in the X—X' direction.

Moreover, the area 13f of the diffraction device 13 may be omitted as required.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In an optical pickup device wherein a main beam and a pair of sub-beams are reflected from a recording medium, and directed to a light receiving device through a diffraction device, the improvement wherein:

said diffraction device comprises first, second and third diffraction regions which diffract the main beams and sub-beams along predetermined diffraction directions, said second and third diffraction regions receiving light beams from said recording medium which are substantially identical in amount to each other, said light receiving device comprises first, second, third and fourth receiving regions, said first and second light receiving regions being juxtaposed, and separated by a line, the main beam which has been diffracted by said first diffraction region is focused onto said line, the main beam which has been diffracted by said second diffraction region is focused onto said first light receiving region, the main beam which has been diffracted by said third diffraction region is focused onto said second light receiving region, and the sub-beams which have been diffracted by said diffraction device are focused onto said third and fourth light receiving regions, respectively.

2. An optical pickup device according to claim 1, wherein said line extends along a direction which substantially coincides with the diffraction direction along which said main beam is diffracted in said first diffraction region.

3. An optical pickup device according to claim 1, wherein said diffraction regions are different in grating period from each other.

4. An optical pickup device according to claim 1, wherein said diffraction device has a circular shape.

5. An optical pickup device according to claim 4, wherein said first diffraction region is formed into a semicircular shape, and said second and third diffracting regions are formed into a quadrant shape, respectively.

6. An optical pickup device according to claim 1, wherein gratings of said first, second and third diffraction gratings are not parallel to each other.

7. An optical pickup device according to claim 6, wherein gratings of said second and third diffraction regions extend at opposite angles with respect to said line.

8. An optical pickup device according to claim 4, wherein said first diffraction region is formed into a semicircular shape, said second and third diffracting regions share a semicircle, and said second diffracting region is formed into a strip-like shape positioned between said first and third diffraction regions.

9. In an optical pickup device comprising: a light source; a diffraction device; an optical system disposed between said diffraction device and a recording medium, said optical system focusing light beams from said light source onto said recording medium, said optical system directing light beams reflected from said recording medium to said diffraction device; and a light receiving device which is spaced transversely from the optical axis of the device and receives light beams from said diffraction device, the improvement wherein:

said diffraction device comprises an area where one or more diffraction regions are formed, said area having a first side and a second side with the first side being transversely nearer the receiving device than the second side, the first side of said area being separated from said optical axis by a predetermined distance, and the second side being separated from said optical axis by a distance which is greater than said predetermined distance.

*10. An optical pickup device comprising:*

*a light source for emitting light beams;*

*an optical system for focusing said light beams emitted from said light source onto a recording medium, said optical system allowing said light beams reflected from said recording medium to pass therethrough;*

*a light receiving means which receives said light beams reflected from said recording medium;*

*a diffraction means, disposed between said light source and said optical system across an optical axis of dividing said light beams emitted from said light source into at least a zero-order diffracted beam and first-order diffracted beams and for introducing said light beams reflected from said recording medium into said light receiving means;*

*wherein said diffraction means has a diffraction area where a diffraction grating is formed, said optical axis of said light beams emitted from said light source passing through a position of said diffraction area, said position being separated from an end portion of said diffraction area by a predetermined distance, said end portion being closer to said light receiving means than any other end portion of said diffraction area; and wherein said predetermined distance is set so that said first-order diffracted beams from the diffraction means are not incident on said optical system.*

*11. A optical pickup device according to claim 10, wherein tracks are formed on said recording medium, and said diffraction area is formed so that a width thereof in a direction parallel to said tracks is larger than a width of said diffraction area in a direction perpendicular to said tracks.*

*12. An optical pickup device comprising:*

*a light source for emitting light beams;*

*an optical system for focusing said light beams emitted from said light source onto a recording medium, said optical system allowing said light beams reflected from said recording medium to pass therethrough;*

*a light receiving means which receives said light beams reflected from said recording medium;*

*a diffraction means, disposed between said light source and said optical system across an optical axis of said light beams emitted from said light source, for dividing said light beams emitted from said light source into at least a zero-order diffracted beam and a plurality of first-order diffracted beams and for introducing said light beams reflected from said recording medium into said light receiving means;*

*wherein said diffraction means has a diffraction area where a diffraction grating is formed, said optical axis of said light beams emitted from said light source passing through said diffraction area; and wherein a distance from said optical axis to an end portion of said diffraction area is set so that said first-order diffracted beams from said diffraction means are not incident on said optical system.*

*13. An optical pickup device comprising:*

*a light source for emitting light beams;*

*an optical system for focusing said light beams emitted from said light source onto a recording medium, said*

*optical system allowing said light beams reflected from said recording medium to pass therethrough;*

*a light receiving means which receives said light beams reflected from said recording medium;*

*a diffraction means, disposed between said light source and said optical system across an optical axis of said light beams emitted from said light source, for dividing said light beams emitted from said light source into at least a zero-order diffracted beam and a plurality of first-order diffracted beams and introducing said light beams reflected from said recording medium into said light receiving means;*

*wherein said diffraction means has a diffraction area where a diffraction grating is formed, said diffraction area having a first end portion and a second end portion in a direction perpendicular to said diffraction grating, a distance between said second end portion and said light receiving means being larger than a distance between said first end portion and said light receiving means; and wherein said optical axis of said light beams emitted from said light source passes through a position of said diffraction area at a predetermined distance from said first end portion; and wherein said predetermined distance is set so that said first-order diffracted beams from said diffraction means are not incident on said optical system.*

*14. An optical pickup device according to claim 13, wherein a width of said diffraction area in a direction parallel to said diffraction grating is larger than a width of said diffraction area in a direction perpendicular to said diffraction grating.*

* * * * *